United States Patent [19]
Takiguchi et al.

[11] Patent Number: 6,000,949
[45] Date of Patent: Dec. 14, 1999

[54] CIRCUIT CONNECTION STRUCTURE FOR AUTOMOBILE DOORS

[75] Inventors: Shuji Takiguchi; Keizo Nishitani; Takeaki Matsunaga, all of Shizuoka, Japan

[73] Assignee: Yazaki Corporation, Tokyo, Japan

[21] Appl. No.: 08/859,691

[22] Filed: May 21, 1997

[30] Foreign Application Priority Data

May 23, 1996 [JP] Japan .................................. 8-128699

[51] Int. Cl.⁶ .................................................. H01R 33/00
[52] U.S. Cl. .......................................... 439/34; 174/72 A
[58] Field of Search ........................... 439/34; 174/72 A; 296/146.1–146.16, 152

[56] References Cited

U.S. PATENT DOCUMENTS 5,460,530  10/1995  Toba et al. ................................. 439/34

FOREIGN PATENT DOCUMENTS 1-249516  10/1989  Japan .

Primary Examiner—Gary F. Paumen
Attorney, Agent, or Firm—Armstrong, Westerman, Hattori, McLeland & Naughton

[57] ABSTRACT

Circuit bodies (4) and (11) are respectively mounted on surfaces of a door trim (3) and a door panel (2). The circuit body (4) includes a circuit plate (17) and a switch holder (18) which has fixed therein an end portion of the circuit plate. The holder (18) is disposed between mount arms (39) on the door trim, and to the holder is mounted a switch unit (20) so that contact portions of the end portion of the circuit plate are registrated with keys (21) of the switch unit (20). The holder (18) has positioning pins (36) for the end portion of the circuit plate and for the switch unit (20). The circuit body (4) has a tongue-like connecting portion for connecting to a connector on the door trim (3) side. Circuits and auxiliaries on the door trim side are easily and reliably connected to circuits on the door panel side.

10 Claims, 6 Drawing Sheets

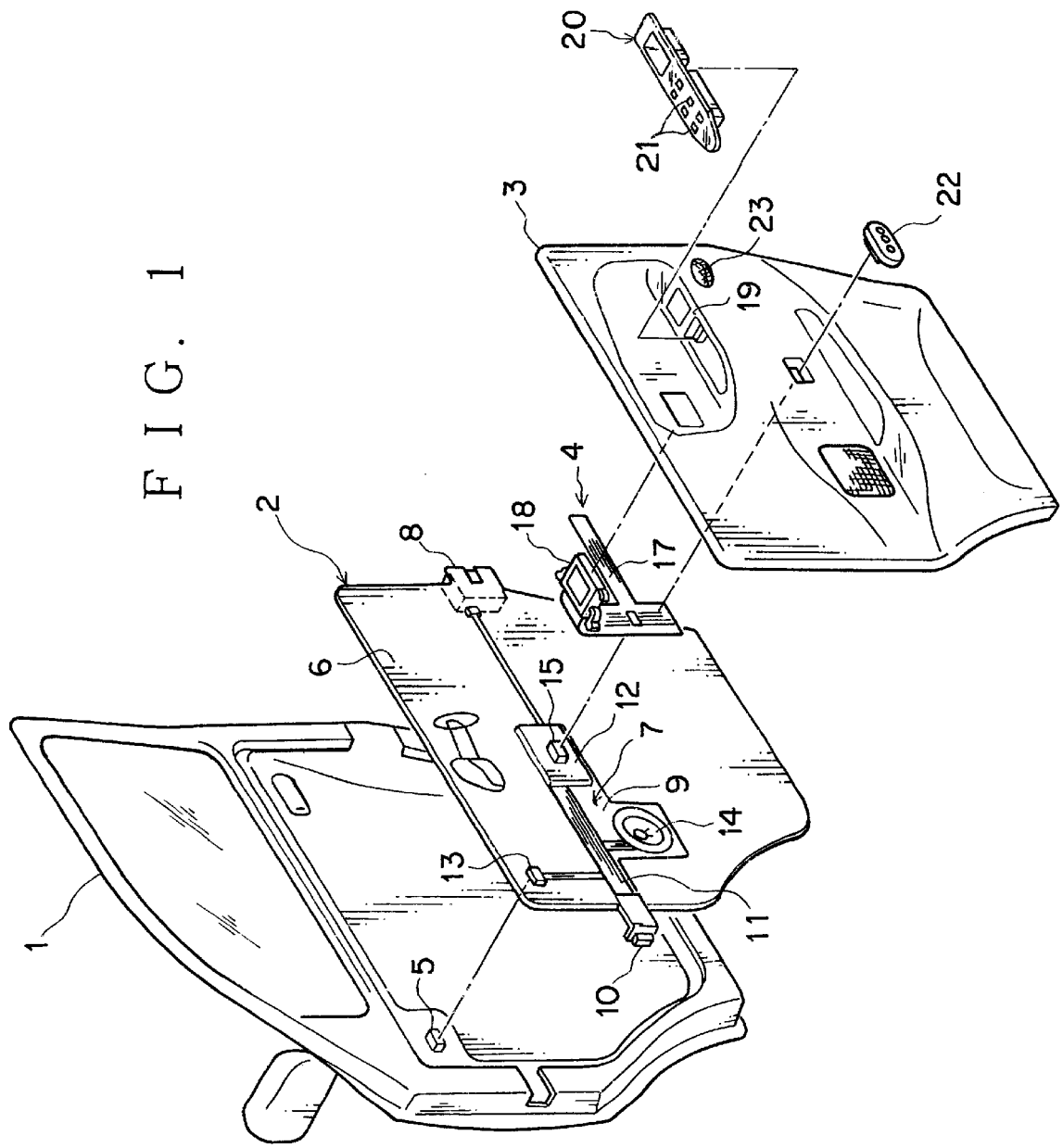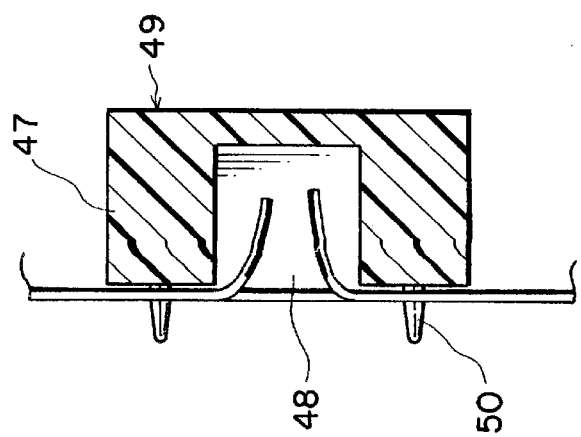

CIRCUIT CONNECTION STRUCTURE FOR AUTOMOBILE DOORS

BACKGROUND OF THE INVENTION

1. Field of the Invention

This invention relates to a circuit connection structure for automobile doors which enables a circuit and auxiliaries on the side of a door trim to be easily and reliably connected to a circuit on a door panel side.

2. Description of the Related Art

An automobile door is implemented with various components such as a window opening and closing mechanism, door mirror driving mechanism, door locking mechanism and the like as well as with a wiring harness consisting of wires and connectors for electrically connecting those components. The installation of such a wiring harness is effected in many cases by blind work through a work window provided in a door panel, making the installation work very troublesome. Besides, a number of parts are needed for electric connection of such mechanisms, whose assembly and connection operations are also troublesome.

To cope with these problems, various proposals have been made which include a circuit connection structure for automobile doors as shown in FIG. 11, which is previously proposed by the present applicant. In this structure, the troublesome installation of various auxiliaries and of a wiring harness is facilitated by mounting a panel unit 87 on a door panel 88, the panel unit being equipped with a flat wiring harness 85 and auxiliaries (a speaker 86, power window motor and the like). The panel unit 87 is connected via connectors 92 and 93 to various switches 91 disposed on an arm rest 90 on the side of the door trim 89.

The structure as mentioned above has made a large improvement in the workability for mounting on the side of the door panel 88, but improvements remain still to be made in the workability for mounting on the door trim 89 side.

SUMMARY OF THE INVENTION

This invention has been accomplished to overcome the above drawbacks and an object of this invention is to provide a circuit connection structure for automobile doors which improves the workability for mounting circuits on the door trim side, and which realizes a reduction in components for electric connection and the like.

In order to attain the object, according to an aspect of this invention, there is provided a circuit connection structure for automobile doors, which comprises: first auxiliaries disposed inside a door panel; a control substrate for controlling the first auxiliaries; a first circuit body mounted on a surface of the door panel, the first circuit body connecting the first auxiliaries and the control substrate to each other; second auxiliaries disposed inside a door trim; and a second circuit body of flat shape mounted on a surface of the door trim, the second circuit body connecting the second auxiliaries and being connector-connectable to the first circuit body.

Preferably, a connector is provided on the control substrate for connecting the first and second circuit bodies to each other.

According to another aspect of this invention, there is provided a circuit connection structure for automobile doors, which comprises: a first circuit body mounted on a surface of a door panel; and a second circuit body of flat shape mounted on a surface of a door trim, the second circuit body being connector-connectable to the first circuit body for connecting a circuit on the door trim side to the first circuit body.

Preferably, the first circuit body is connected to an auxiliary on the door panel side.

Preferably, the second circuit body of flat shape is connected to an auxiliary on the door trim side.

With these structural features, a circuit can be easily constructed on the side of the door trim by the surface-mounting of the second circuit body of flat shape, and auxiliaries such as the switch unit and courtesy lamp can be connected to the first circuit body on the door panel side via the second circuit body of flat shape. Further, by providing the first and second circuit bodies separately on the door panel and door trim sides and connecting them to their respective auxiliaries, a facilitation is made in the assembly work as compared with the case where circuits are concentrated, for example, only on the door panel side.

Preferably, the second circuit body of flat shape comprises a flexible circuit plate and a switch holder which fixes thereto an end portion of the flexible circuit plate, wherein the switch holder is installed in a mount means provided on the door trim, and wherein a switch unit is installed on, the switch holder to connect the end portion of the flexible circuit plate to the switch unit.

With this structural feature, the switch holder is inserted into the mount means, and in the thus mounted switch holder is installed the switch unit, so that the second circuit body of flat shape is easily connected to the switch unit.

Preferably, the switch holder has positioning pins projecting thereon for engagement in engagement holes provided in the end portion of the flexible circuit plate.

Preferably, the switch unit has supports projecting thereon and engageable with the positioning pins on the switch holder.

With these structural features, the positioning pins engage in the engagement holes of the end portion of the flexible circuit plate to position the end portion and engage in the supports of the switch unit to position the switch unit relative to the end portion, so that contact positions of the end portion and of the switch unit are registered with accuracy, thereby ensuring a reliable on-off switching operation, i.e., on-off of contacts. Further, the height of the switch unit relative to the switch holder is controlled by the supports, leading to an improved accuracy of a switching operation. In addition, since the second circuit body and the switch unit are separatable, a better maintenance is obtained.

Preferably, the switch holder comprises a base plate and a lid rotatably supported on the base plate, the lid having an opening for insertion therethrough of the switch unit, and the base plate and the lid have respective locking means engageable with each other to lock the base plate and the lid to each other with the end portion of the flexible circuit plate held therebetween.

With this structural feature, the end portion of the second circuit body can be reliably fixed to the switch holder at one operation by closing the lid. Further, since the flexible circuit plate can be removed when the lid is opened, a better maintenance is obtainable.

Preferably, the switch holder has resilient means by means of which the switch holder is movably held inside the mount means provided on the door trim.

With this structural feature, the switch unit can be easily and reliably assembled to the switch holder, the switch holder being movable and absorbing errors in position relative to the switch unit.

Preferably, the switch unit has a key top and the end portion of the flexible circuit plate has a contact portion at a position in correspondence to the key top, the contact portion comprising a pair of contacts opposed to each other inside an insulating film of the end portion of the flexible circuit plate, with an empty space between the opposed contacts.

With this structural feature, since no contacts are required on the side of the switch unit, a reduction in the number of parts is obtained. Further, since the contacts on the side of the flexible circuit plate are enclosed in an insulating film, an improvement is made in protection against water, duration of life of the contacts and reliability of electric connection.

Preferably, a cut is made in the flexible circuit plate of the second circuit body to provide a tongue-like connecting portion, the connecting portion having thereon exposed conductor portions, and wherein a housing is provided on the door trim to receive the connecting portion therein and constitute a connector for connector-connecting the second circuit body to the first circuit body.

With this structural feature, since a connector is constructed on mounting the second circuit body of flat shape on the door trim surface, the connector assembling step as conventionally required can be omitted. Further, since the connector can be constructed without the use of existing terminal lugs, a reduction in the number of parts is obtained.

Preferably, the door trim has a lamp holder projecting thereon, the lamp holder having a positioning projection therein, a bulb, and an opening at one side thereof, and the flexible circuit plate of the second circuit body includes a lamp connecting portion, the lamp connecting portion having an engagement hole for the positioning projection inside the lamp holder, an insertion hole for the bulb, and an exposed conductor portion around the bulb insertion hole, and wherein the bulb connecting portion is inserted through the opening into the bulb holder such that the positioning projection engages in the engagement hole to position the bulb connecting portion and set the bulb connecting portion in connection with the bulb.

With this structural feature, the bulb and the second circuit body are directly connected to each other, leading to a reduction in the number of required parts and facilitating the connecting operation. Further, since the bulb can be assembled from the side of the cabin, a better maintenance is obtained.

Thus, according to this invention, the circuit and auxiliaries on the door trim side can be easily connected to the circuit on the door panel side, and a cost reduction is attained through a reduction in the number of parts.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIG. 1 is an exploded perspective view of a circuit connection structure for automobile doors according to this invention;

FIG. 6 is a longitudinal sectional view taken along the line A—A of FIG. 4, showing a connection portion of the flat circuit body for connecting to a connector on the side of a door panel;

DESCRIPTION OF THE PREFERRED EMBODIMENTS

Figure 2:
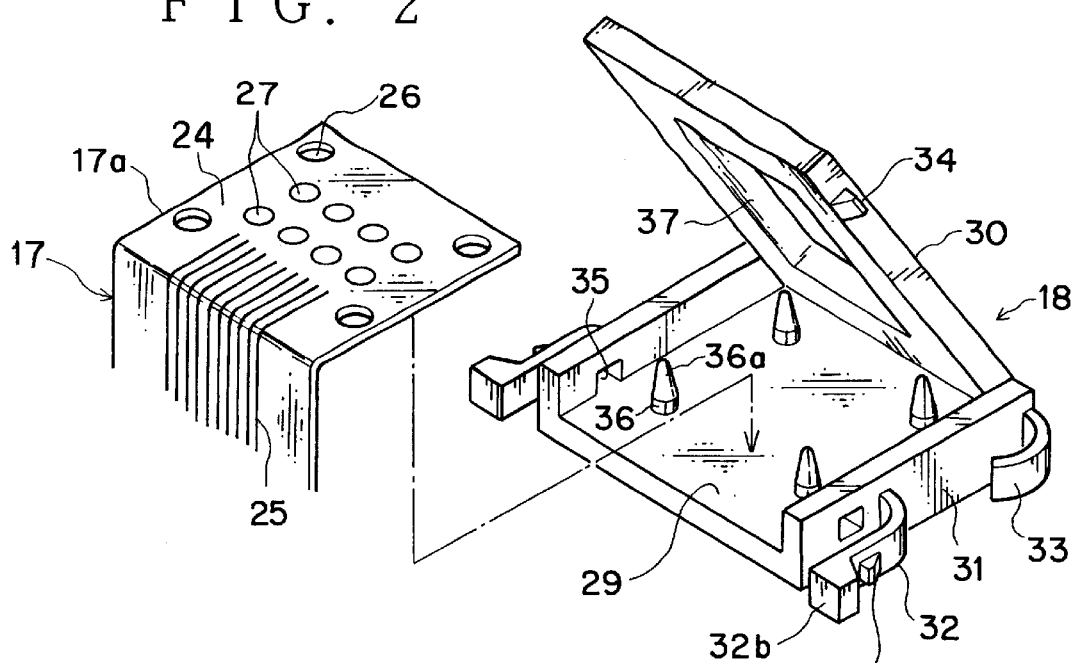
FIG. 2 is a perspective view of a flexible print circuit plate about to be assembled to a switch holder.

Embodiments of this invention will now be described in detail with reference to the attached drawings.

FIG. 1 is a general view of a circuit connection structure for automobile doors according to one embodiment of this invention. In this figure, denoted 1 is a metallic door panel, 2 a panel unit (inner door panel) mounted on the door panel 1, 3 a door trim of synthetic resin, and 4 a flat circuit body mounted on the door trim 3.

A connection connector 5 for driving a door mirror is provided on the door panel 1. The panel unit 2 to be mounted on the door panel 1 consists roughly of a synthetic-resin made base panel 6 of a size smaller than the door panel 1, a unit main body 7 assembled on the base panel 6, and a door lock unit (auxiliary) 8.

The unit main body 7 is made up of an insulating base plate 9, a flexible print circuit plate 11 disposed on the base plate 9 and having a connector 10 for electrically connecting to a not-shown engine side, a communication control substrate 12 connected to the print circuit plate 11, a connector 13 for connecting to the connector 5 on the side of the door panel 1, a speaker (auxiliary) 14 assembled on the insulating base plate 9 and the like. The communication control substrate 12 is provided with a collective connector 15 for connecting to the door trim 3 side. The print circuit plate 11, connectors 13, 15 and the control substrate 12 constitute a flat circuit body 16 on the side of the door panel. Such a unit main body 7 has previously been proposed by the present applicant.

The flat circuit body 4 is mounted on a rear surface of the door trim 3 to face the panel unit 2. The flat circuit body 4 consists of a T-shaped flexible print circuit plate 17 and a switch holder 18 attached to a front end of the circuit plate 17. The structure of the flat circuit body 4 will be later described in more detail.

The switch holder 18 is installed inside an arm rest 19 bulged at a front side (cabin side) of the door trim 3. A main switch unit (auxiliary) 20 is installed on top of the arm rest 19 to be connected to the flat circuit body 4. The main switch unit 20 has switches (key tops) 21 for respective standard components. Towards a center of the door trim 3 is installed an option switch unit (auxiliary) 22 for optional components. The option switch unit 22 is also connected to the flat circuit body 4. At a rear portion of the door trim 3 is installed a courtesy lamp (auxiliary) 23.

FIG. 2 is an exploded view of the switch holder 18 of the flat circuit body 4.

An upper end portion 17a of the flexible print circuit plate 17 is bent at right angles and fixed in the switch holder 18.

The print circuit plate 17 consists of an insulating film 24 of synthetic resin and a plurality of print circuits 25 arranged in a row inside the insulating film 24. The insulating film 24 at the end portion 17*a* has engagement holes 26 provided therethrough at four corners and a plurality of contact portions 27 continuous to the respective circuits 25.

Figure 3:
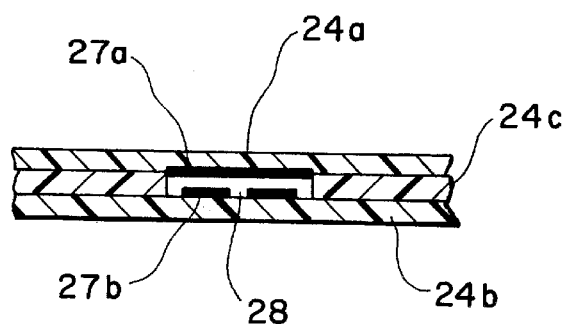
FIG. 3 is a longitudinal sectional view of a contact portion of a switch.

Each contact portion 27, as shown in FIG. 3, consists of an upper contact 27*a* formed on an upper film 24*a*, and a lower contact 27*b* formed on a lower film 24*b* in opposition to the upper contact 27*a* with an empty chamber 28 therebetween which is formed in a spacer film 24*c* sandwiched between the upper and lower films 24*a* and 24*b*. Each contact 27*a*, 27*b* is, being enclosed in the film 24, protected from water, moisture and the like, and an electric contact failure is unlikely to take place which would otherwise be caused by moisture or the like. Key tops 21, when pressed, bring respective upper and lower contacts 27*a*, 27*b* into contact with each other.

In FIG. 2, the switch holder 18 is formed from synthetic resin and made up of a rectangular base plate 29 and a frame-like lid 30 which is rotatable relative to the base plate 29, the lid being for example joined to the base plate 29 via an integral thin hing or the like. The base plate 29 is at opposite sides provided with lateral walls, each having on its outer surface a resilient lock arm 32 and a curved resilient piece 33 for engagement with the door trim 3, the former on the proximal side and the latter on the distal side. The resilient lock arm 32 has a lock projection 32*a* and a lock release lever portion 32*b*. Each lateral wall 31 is also formed with an engagement hole 35 for engagement therein of a corresponding lock projection 34 on the lid 30.

The base plate 29 has positioning pins 36 projecting thereon, each having a conical, inclined guide surface 36*a* for facilitating insertion into a corresponding engagement hole 26 of the flexible print circuit plate 17. The lid 30 has an opening 37 within which the contact portions 27 of the print circuit plate 17 and the positioning pins 36 are to be located. The inclined guide surface 36*a* may extend over the entire length of a positioning pin 36 from the upper to lower end.

The end portion 17*a* of the print circuit plate 17 is disposed in position on the base plate 29, with its engagement holes 26 engaged to the respective positioning pins 36. When the lid 30 is then closed, its lock projections 34 engage in the engagement holes 35 to lock the end portion 17*a* between the lid 30 and the base plate 29. The positioning pins 36 are located inside the opening 37. The positioning pins 36 thus enable the contact portions 27 to be positioned with accuracy.

Figure 4:
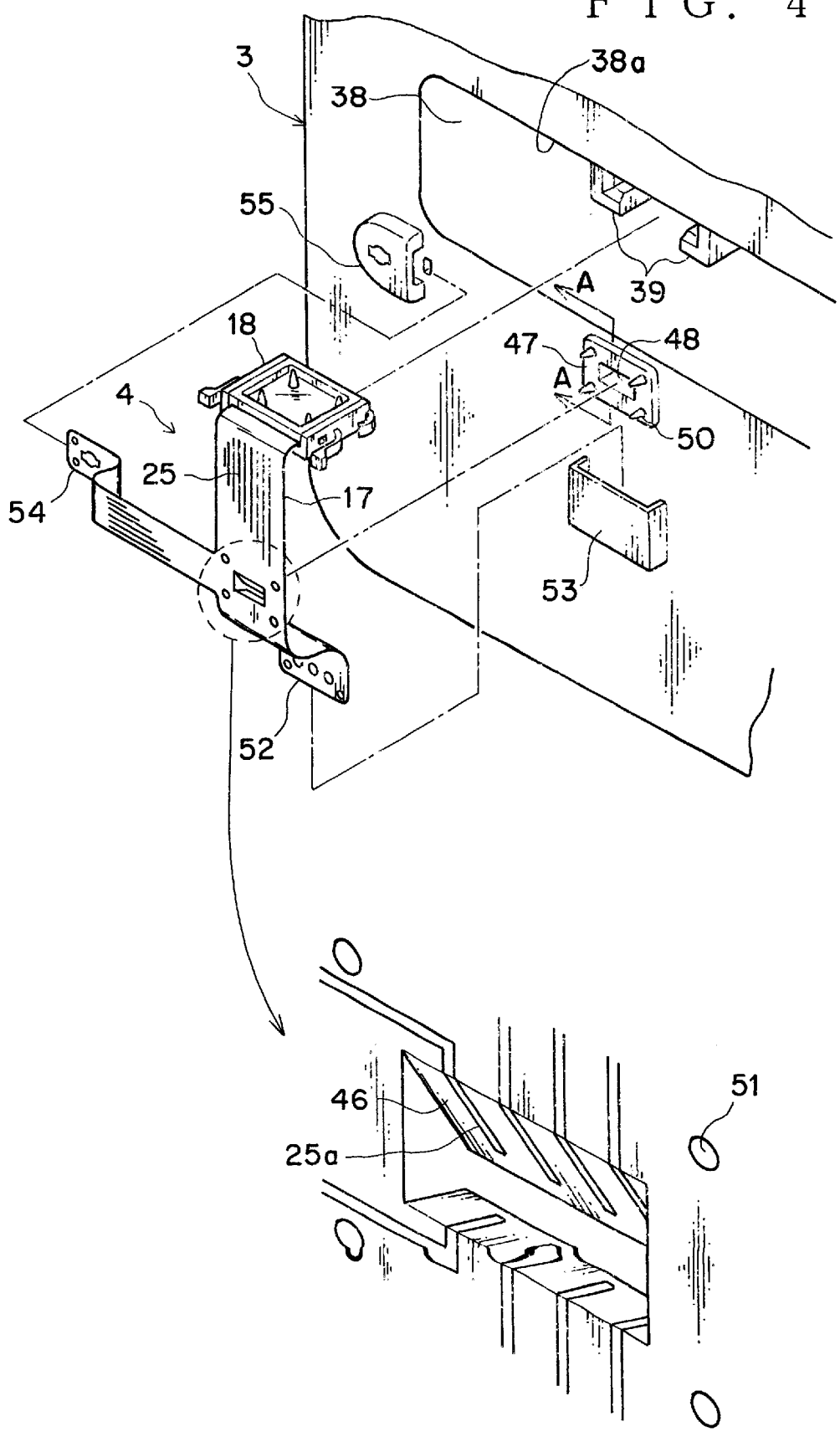
FIG. 4 is a perspective view of a flat circuit body about to be mounted on a door trim, with a portion shown enlarged.

FIG. 4 shows the flat circuit body 4 about to be assembled to the door trim 3.

The door trim 3 has an opening 38 inside which a pair of mount arms 39 for the switch holder 18 of the flat circuit body 4 are provided to extend in a width direction of the door trim. The mount arms 39, each of L-shape, project downwardly from an upper wall 38*a* of the opening 38. The mount arms 39 are formed with not-shown engagement holes corresponding to the lock projections 32*a* on the resilient lock arms 32 of the switch holder 18. The resilient lock arms 32 and the resilient pieces 33 allow the switch holder 18 to be supported laterally movable between the pair of mount arms 39, thereby enabling the main switch unit 20 to be reliably positioned relative to the switch holder 18 (FIG. 5).

Figure 5:
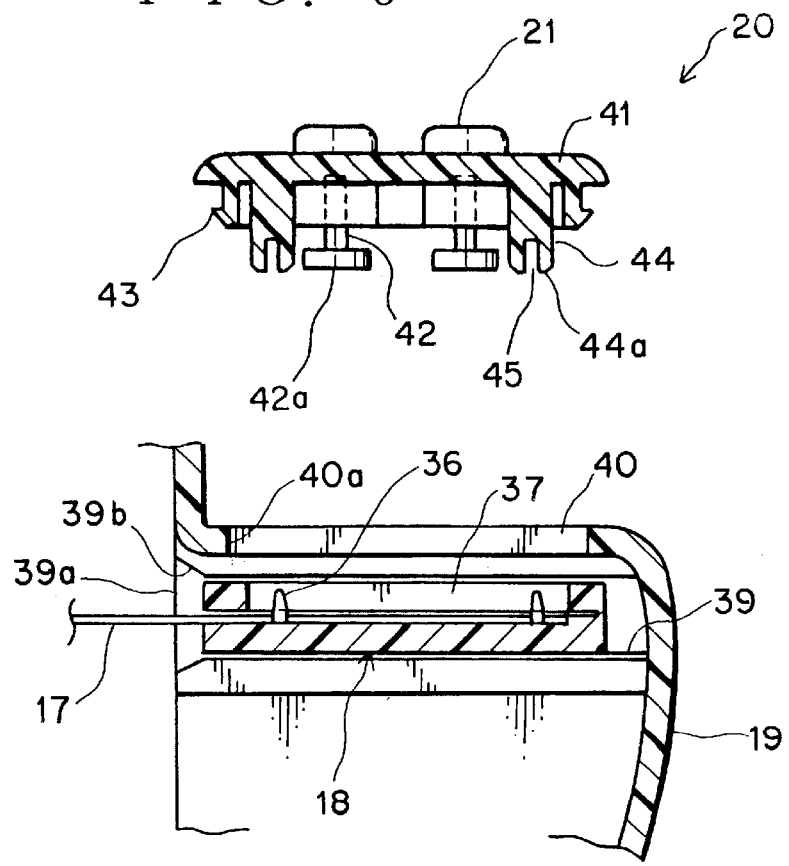
FIG. 5 is a longitudinal sectional view of a switch unit about to be engaged on the switch holder.

In FIG. 5, the switch holder 18 is in inserted position in the mount arms 39 on the door trim 3 side. Denoted 17 is the flexible print circuit plate fixed in the switch holder 18, and 36 the positioning pins. The mount arms 39 are at the side of the opening 39*a* formed with inclined guide surfaces 39*b* for facilitating the insertion of the switch holder 18. The door trim 3 (arm rest 19) has an opening 40 at a position above the upper opening 37 of the switch holder 18, which is larger in size than the latter and in which the main switch unit 20 is installed.

The main switch unit 20 includes a base plate 41 of synthetic resin, a plurality of key tops 21 vertically movably disposed on the base plate 41, and press pins 42 joined to the respective key tops 21 and extending through the base plate 41 to the lower side thereof. These key tops 21 are operated to effect, for example, the opening and closing of windows, seat memory and the like. The base plate 41 is provided with depending resilient lock claws 43 and supports 44, the former engageable with edges 40*a* of the opening 40 in the door trim 3 and the latter opposed to the respective positioning pins 36 of the switch holder 18. Each support 44 has at a center thereof an engagement hole 45 for insertion therein of the corresponding positioning pin 36. Each press pin 42 is at the tip provided with a disc 42*a* which is pressed against the corresponding contact portion 27 of the print circuit plate 17 (FIG. 3).

By inserting the main switch unit 20 into the opening 40 in the door trim 3 (arm rest 19), the positioning pins 36 of the switch holder 18 engage in the engagement holes 45 of the supports 44 to registrate the main switch unit 20 and the switch holder 18, and thus the discs 42*a* of the press pins 42 and the contact portions 27. In other words, since the positioning of the contact portions 27 is already effected through the cooperation of the engagement holes 26 and the positioning pins 36, the press pins 42 can be positioned with accuracy relative to the contact portions 27 by having recourse to the positioning pins 36.

In this instance, the resilient pieces 33 and the resilient arms 32 of the switch holder 18 deflect to absorb positional errors between the switch holder 18 and the main switch unit 20, and thus the main switch unit 20 is assembled with ease. The resilient lock claws 43 of the main switch unit 20 engage the opening edges 40*a* to lock the main switch unit 20 to the door trim 3. The supports 44 serve to accurately define the spacing between the discs 42 of the press pins 42 and the contact portions 27. In other words, front ends 44*a* of the supports 44 contact the circuit plate 17, or front ends of the positioning pins 36 contact bottom surfaces of the engagement holes 45 of the supports 44 to define the spacing, so that on-off operations of the switch are performed with accuracy.

As shown in FIG. 4, at an intermediate length of the flexible print circuit plate 17 of the flat circuit body 4, there are provided tongue-like connecting portions 46. As shown enlarged in FIG. 4 and in FIG. 6, a cut is made in an H-shape in the print circuit plate 17 to provide the connecting portions 46 which are bent towards the door trim 3 side and which have thereon exposed conductor portions 25*a* continuous to the circuits 25.

The connecting portions 46, as shown in FIG. 6, are disposed inside a recess 48 in a housing 47 of insulating resin assembled to the door trim 3 and constitute, together with the housing 47, a connector 49. The housing 47 has, for example, a not-shown clip insertion hole and is fixed to the door trim 3 with a push-fit clip inserted in the insertion hole. The housing 47 is provided with an upper and lower pair of projecting positioning pins 50, and the print circuit plate 17 is provided with throughholes 51 (FIG. 4) corresponding to the positioning pins 50. The positioning pins 50 may alternatively consist of a single pair of upper and lower ones.

With the positioning pins 50 inserted into the respective throughholes 51, the exposed conductor portions 25a are reliably disposed in position inside the housing 47. To the thus constructed connector 49 is connected the collective connector 15 of the communication control substrate 12 on the panel unit 2. The panel unit 2 is in advance mounted on the door panel 1, and the connection of both connectors 15 and 49 is effected concurrently with the assembly of the door trim 3 to the door panel 1.

As shown in FIG. 4, the circuit plate 17 is at the lower end provided with a connecting portion 52 for the option switch unit 22 (FIG. 1), and the door trim 3 has thereon an option switch holder 53 to which the connecting portion 52 is attached. The structures of the connecting portion 52 and of the option switch holder 53 may be the same as in the switch holder 18.

The circuit plate 17 is at a laterally extended position also provided with a lamp-connecting portion 54 for the courtesy lamp 23. The lamp-connecting portion 54 is disposed inside a lamp holder 55 on the door trim 3.

Figure 8:
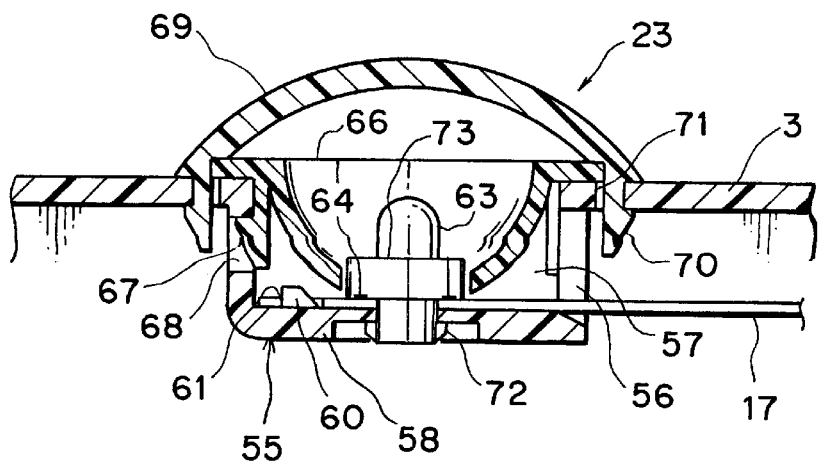
FIG. 8 is a longitudinal sectional view of the courtesy lamp in connected position.
Figure 7:
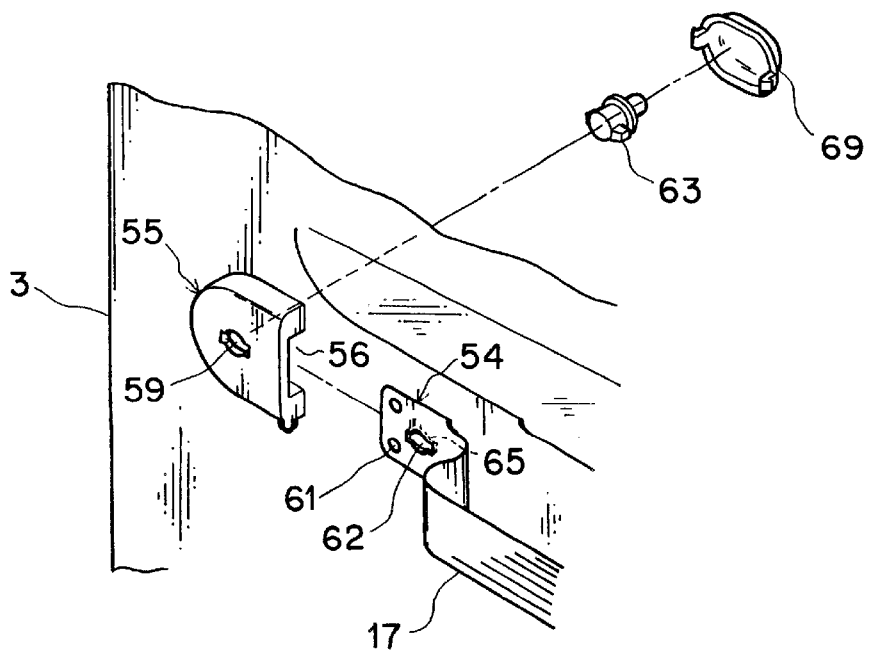
FIG. 7 is an exploded perspective view showing the flat circuit body about to be connected to a courtesy lamp.

FIG. 7 shows the courtesy lamp 23 to be assembled, and FIG. 8 shows the courtesy lamp assembled.

The lamp holder 55 is provided projecting on the rear surface of the door trim 3 and has at a lateral side thereof an insertion opening 56 for the lamp-connecting portion 54 of the circuit plate 17. The lamp holder 55 has a bulb-accommodating recess 57 (FIG. 8) therein which opens through the door trim 3 and is in communication with the insertion opening 56. A bulb mount hole 59 is formed through a bottom wall 58 of the lamp holder 55, and a positioning projection 60 for the lamp-connecting portion 54 on the bottom wall 58. The print circuit plate 17 is formed with a bulb insertion hole 62 and an engagement hole 61 for the positioning projection 60. The circuit plate 17 is around the bulb insertion hole 62 formed with an exposed conductor portion 65 for connecting to an electrode 64 of the bulb 63. The lamp holder 55 is at a lateral wall opposite to the insertion opening 56 formed with an engagement hole 68 for a lock claw 67 of a reflector 66, and the door trim 3 is formed with an engagement hole 71 for a lock claw 70 of a lens 69.

The lamp-connecting portion 54 of the print circuit plate 17 is inserted through the insertion opening 56 into the lamp holder 55 to engage the engagement holes 61 to the positioning projections 60. A lock portion 72 of the bulb 63 (FIG. 8) is then passed through the insertion hole 62 of the circuit plate 17 to be fixed to the lamp holder 55. The circuit plate 17 is held between a flange 73 of the bulb 63 and the bottom wall 58 of the lamp holder 55, so that the electrode 64 of the bulb 63 pressingly connects the exposed conductor portion 65. The reflector 66 and the lens 69 are assembled to complete the connection of the courtesy lamp 23. The structure as described above allows the bulb 63 to be replaced from inside the cabin, leading to enhanced maintenance.

Figure 9:
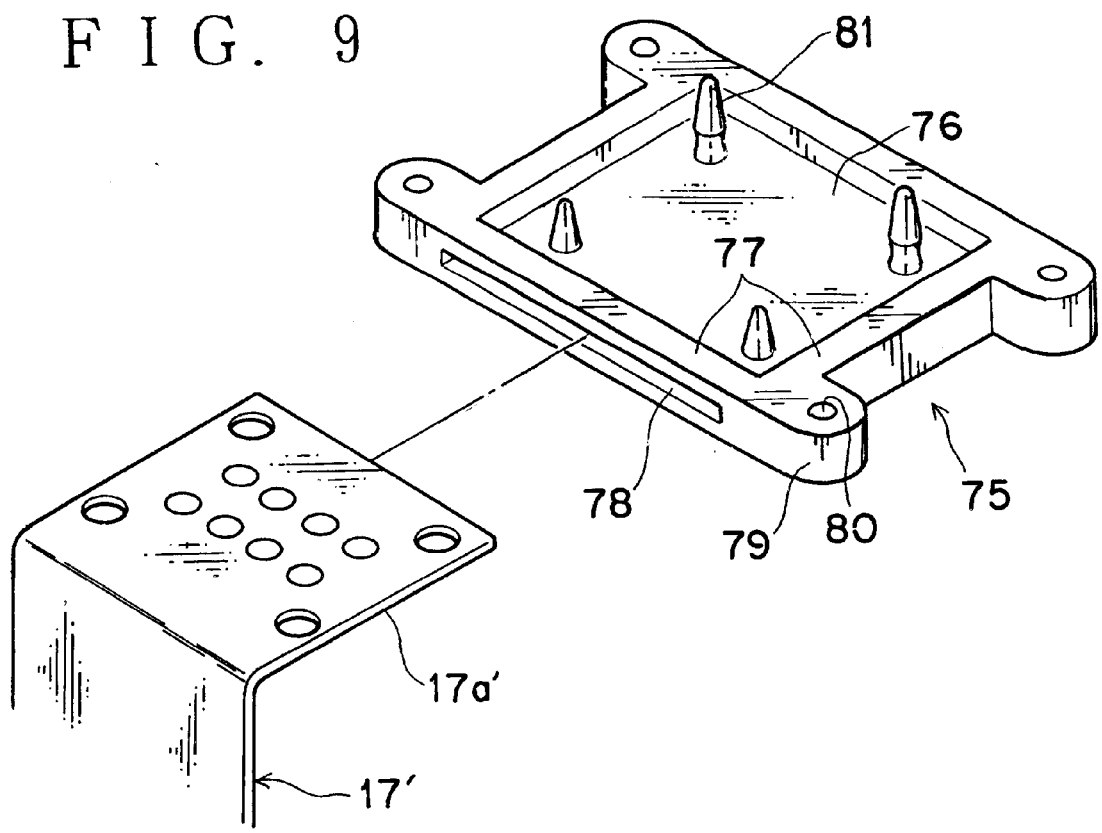
FIG. 9 is a perspective view of a circuit body about to be assembled to another embodiment of a switch holder according to this invention.
Figure 10:
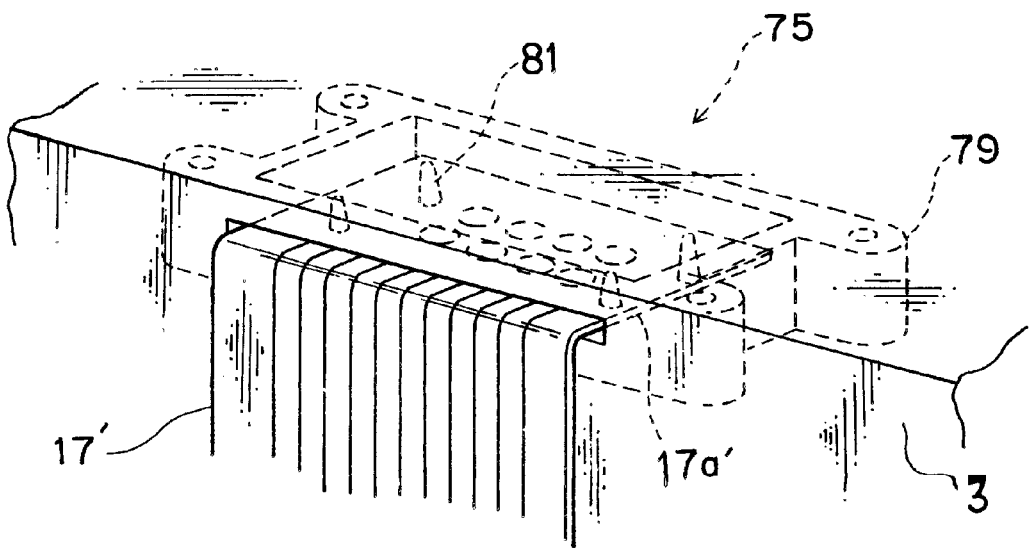
FIG. 10 is a perspective view of the switch holder in assembled position.
Figure 11:
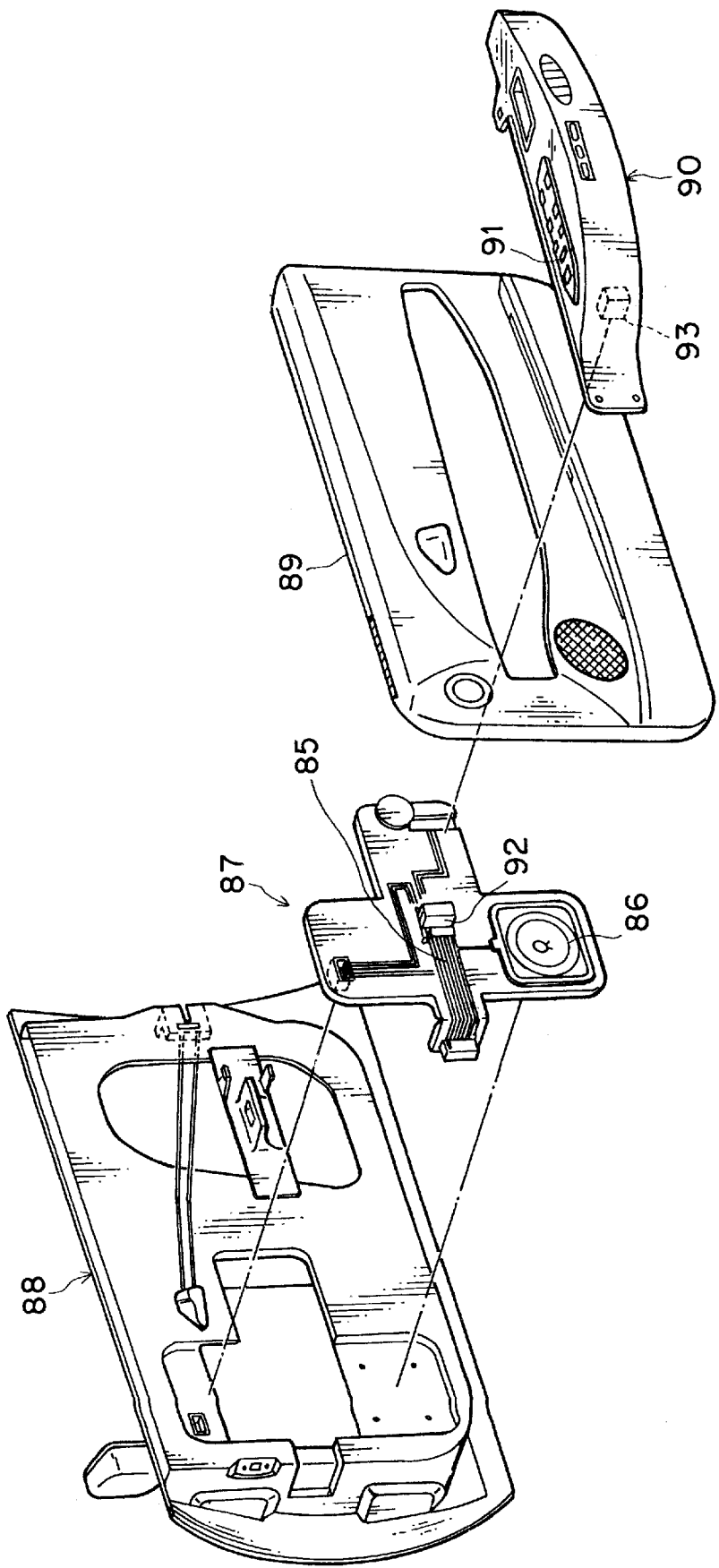
FIG. 11 is an exploded perspective view of a conventional circuit connection structure.

FIGS. 9 and 10 show another embodiment of a switch holder according to this invention.

The switch holder 75 has a simplified structure and, as shown in FIG. 9, includes a base plate 76, a frame-like portion 77 integrally formed around the base plate, and an insertion slit 78 formed at one side of the frame-like portion 77 for a flexible print circuit plate 17'. The frame-like portion 77 has at four corners semiroller-shaped slide engagement portions 79 for engagement with the mount arms 39 (FIG. 4) on the door trim 3 side, each slide engagement portion 79 projecting in a lateral direction and having a fixing hole 80 used in fixing the switch holder 75 to the mount arms 39. Positioning pins 81 for the end portion 17a' of the circuit plate 17' are provided projecting on the base plate 76 as in the preceding example. The end portion 17a' of the flexible print circuit plate 17' may be bonded to the base plate 76.

The switch holder 75, as shown in FIG. 10, is installed inside the door trim 3, with the end portion 17a' of the circuit plate 17' fixed thereto in advance. The flexible print circuit plate 17' is laid along the rear surface of the door trim 3.

Having now fully described the invention, it will be apparent to one of ordinary skill in the art that many changes and modifications can be made thereto without departing from the spirit and scope of the invention as set forth herein.

What is claimed is:

1. A circuit connection structure for automobile doors comprising:
    a first circuit body mounted on a surface of a door panel; and
    a second circuit body of flat shape mounted on a surface of a door trim, said second circuit body being connector-connectible to said first circuit body for connecting a circuit on said door trim side to said first circuit body, said second circuit body of flat shape comprising a flexible circuit plate and a switch holder which fixes thereto an end portion of said flexible circuit plate, wherein said switch holder is installed in a mount means provided on said door trim, and wherein a switch unit is installed on said switch holder to connect said end portion of the flexible circuit plate to said switch unit.

2. The circuit connection structure according to claim 1, wherein said first circuit body is connected to an auxiliary on said door panel side.

3. The circuit connection structure according to claim 1, wherein said second circuit body of flat shape is connected to an auxiliary on said door trim side.

4. The circuit connection structure according to claim 1, wherein said switch holder has positioning pins projecting thereon for engagement in engagement holes provided in said end portion of the flexible circuit plate.

5. The circuit connection structure according to claim 4, wherein said switch unit has supports projecting thereon and engageable with said positioning pins on said switch holder.

6. The circuit connection structure according to claim 1, wherein said switch holder comprises a base plate and a lid rotatably supported on said base plate, said lid having an opening for insertion therethrough of said switch unit, and wherein said base plate and said lid have respective locking means engageable with each other to lock said base plate and said lid to each other with said end portion of the flexible circuit plate held therebetween.

7. The circuit connection structure according to claim 1, wherein said switch holder has resilient means by means of which said switch holder is movably held inside said mount means provided on said door trim.

8. The circuit connection structure according to claim 1, wherein said switch unit has a key top and said end portion of the flexible circuit plate has a contact portion at a position in correspondence to said key top, said contact portion comprising a pair of contacts opposed to each other inside an insulating film of said end portion of the flexible circuit plate, with an empty space between the opposed contacts.

9. The circuit connection structure according to claim 1, wherein a cut is made in said flexible circuit plate of the second circuit body to provide a tongue-like connecting portion, said connecting portion having thereon exposed conductor portions, and wherein a housing is provided on said door trim to receive said connecting portion therein and constitute a connector for connector-connecting said second circuit body to said first circuit body.

10. The circuit connection structure according to claim 1, wherein said door trim has a lamp holder projecting thereon, said lamp holder having a positioning projection therein, a bulb, and an opening at one side thereof, and said flexible circuit plate of the second circuit body includes a lamp connecting portion, said lamp connecting portion having an engagement hole for said positioning projection inside said lamp holder, an insertion hole for said bulb, arid an exposed conductor portion formed around said bulb insertion hole, and wherein said bulb connecting portion is inserted through said opening into said bulb holder such that said positioning projection engages in said engagement hole to position said bulb connecting portion and set said bulb connecting portion in connection with said bulb.

* * * * *